Patented May 14, 1929.

1,713,118

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

METHOD OF TREATING SUGAR SOLUTIONS TO INCREASE THE SUCROSE CONTENT.

No Drawing. Application filed January 29, 1923, Serial No. 615,736. Renewed October 2, 1928.

The invention relates to the recovery of the solid content of sugar juices to provide therefrom a commercial article in the form of a dry powdered product; and it has for its object to materially increase the proportionate sucrose content of the original sugar juice.

This is effected by altering, thru the process employed, the chemical constitution of the invert sugar constitutents of the juice so that a substantial proportion of same is converted into sucrose and the yield of the sugar increased. In the sugar recovery processes, as heretofore carried out, the converse has been the rule, that is to say, there has been a loss of sucrose due to the conversion of same into invert sugars.

I have found, if the sugar juice be rapidly converted into a dry powdered product, as thru the substantially instantaneous desiccation of the juice in finely divided state, that not only is loss of sucrose obviated but a substantial proportion of the invert sugar content of the juice has its chemical constitution altered and is converted into sucrose. This I believe to be due to the removal of a molecule of water from the invert sugars, whereas in the usual operation of drying in mass by long continued heating, especially when acid conditions prevail, a molecule of water is added to the sucrose and the same thereby converted into invert sugar. In the methods as heretofore carried out, every possible precaution is taken in the manufacture of the commercial sugar to reduce this tendency of inversion of the sucrose, lime being generally added to the fresh juice to neutralize the acidity, and minimum temperatures maintained.

However, if the process be carried out in such a manner as to reduce the period of evaporation to a minimum and to prevent the heating of the juice in mass, thru finely subdividing the sugar juice as in spraying same into a hot gaseous evaporating medium, not only is there no loss in the proportionate content of sucrose, but the same is actually increased over that of the original juice.

To this end, the sugar juice, derived from any desired source and after being filtered from mechanical dirt and the like is introduced in finely-divided state, as by atomization or spraying of the juice, to a heated drying gas to drive off substantially all of the contained moisture. While still in suspension and substantially at the moment of completion of the drying, the product is subjected to a cooling action, prior to its collection for the purpose of chilling the dried particles below their critical temperature or non-melting point.

In some instances, it may be desirable to heat the sugar juice before it is atomized or sprayed; but usually it is preferable, in order to prevent any changes due to temperature action in mass, to atomize or spray the same cold. The atomization may be effected by an air atomizer spray; but it is preferable to employ spraying by high pressure spray heads. In the latter case, the pressures may range from 100 lbs. per square inch up to 2,000 or 3,000 lbs., depending upon the character of the spray head orifice and the nature and size of the particle desired.

I have found in practice that initial temperatures over 212° F. are desirable and may even exceed 1,000° F. It is preferable, however, to use the higher range of temperatures for the desiccating medium, as this enables a much lower poundage of same to be employed. While the maximum initial temperature of the gas that may be used is relatively unimportant, yet, if it be desired to preserve the natural solids of the sugar juice, it is necessary that the temperature at the completion of the evaporation of the moisture should not be much over 200°–210° F. It is vital, however, that, immediately upon completion of the evaporation of the moisture from the spray-dried particle, it should be chilled promptly to a much lower temperature. Temperatures below 150° F. and preferably around 125° F. have been found suitable.

It has been demonstrated that the sucrose content may, by this method, be increased as much as 5%. For example, a beet sugar solution containing 8.28% of sucrose and 89.8% of water with 0.64% invert sugar and 1.28% of ash etc., after the foregoing treatment, was found to contain—sucrose 83.6%, water 3.25%, invert sugar 1.80%, ash etc. 11.35%.

In like manner, the ratio between the invert sugars and the sucrose of molasses and similar substances may be raised.

I claim:—

1. The method of producing a substantially dry sugar product of higher total sucrose content than that of the sugar liquor used in its production which consists solely in spraying a sugar containing liquor, the solids of which are principally sucrose, into a hot drying gas, maintaining said sprayed juice in suspension in the drying gas until drying is complete and then promptly relieving the dried material from the influence of high temperatures and collecting the dry finely divided sugar product.

2. In the manufacture of sugar, the method of increasing the sucrose and decreasing the invert sugar in the solids of a sugar solution consisting principally of sucrose but containing some invert sugar which comprises introducing the said sugar solution in finely divided condition into a drying gas at an elevated temperature relative to the boiling point of the said solution, whereby substantially instantaneous desiccation of the finely divided sugar material takes place, regulating conditions so that the temperature to which the desiccated sugar material is subjected for any substantial time is below the boiling temperature of the said solution, and collecting the dry sugar product.

3. The method of recovering in substantially dry powder form the solid content of a sugar solution which contains sucrose and invert sugar and at the same time obtaining in the powder product a ratio of sucrose to invert sugar which is substantially greater than the ratio of sucrose to invert sugar in the initial sugar solution, which comprises spraying the sugar solution into a hot drying gas, effecting a reduction in the temperature of the sprayed material by the time drying thereof is substantially completed to a value at which the product is not injured, and collecting the powder product.

Signed at New York in the county of New York and State of New York this 27th day of January, A. D. 1923.

WALTER H. DICKERSON.